United States Patent
Weiss et al.

(10) Patent No.: US 6,762,801 B2
(45) Date of Patent: Jul. 13, 2004

(54) VARYING LIGHT TRANSMITTANCE THROUGH A DISPLAY PANEL

(75) Inventors: Victor Weiss, Rehovot (IL); Uzi Orion, Yavne (IL)

(73) Assignee: ELOP Electro-Optics Industries Ltd. (IL)

( * ) Notice: Subject to any disclaimer, the term of this patent is extended or adjusted under 35 U.S.C. 154(b) by 42 days.

(21) Appl. No.: 09/859,740

(22) Filed: May 18, 2001

(65) Prior Publication Data

US 2002/0008708 A1 Jan. 24, 2002

(30) Foreign Application Priority Data

May 21, 2000 (IL) .................................................. 136248

(51) Int. Cl.[7] ...................... G02F 1/1335; G02F 1/1333; G09G 5/00
(52) U.S. Cl. ............................. 349/16; 349/10; 349/11; 349/86; 345/597
(58) Field of Search ............................... 349/11, 86, 10, 349/16, 114, 115; 345/597

(56) References Cited

U.S. PATENT DOCUMENTS

| 4,997,263 A | * | 3/1991 | Cohen et al. .................. 349/11 |
| 5,377,037 A | * | 12/1994 | Branz et al. ................. 359/265 |
| 2001/0004279 A1 | * | 6/2001 | Sako et al. .................. 349/158 |

FOREIGN PATENT DOCUMENTS

EP        1 093 008 A1 * 4/2001

\* cited by examiner

*Primary Examiner*—Tarifur R. Chowdhury
(74) *Attorney, Agent, or Firm*—Connolly Bove Lodge & Hutz, LLP

(57) ABSTRACT

The invention provides a system for varying the transmittance of light through selected portions of a media on which images are displayed, the system including an image display panel, an image display source for projecting images on the media, LC-based, variable transmittance optical (VTO) media, a light sensor for measuring ambient light, and a signal generator connected to the VTO media for applying voltage to portions of the media at levels determined and controlled by the sensor, whereby the transmittance of light through the portions of the media is varied in accordance with the prevailing ambient light. A method is also provided.

11 Claims, 1 Drawing Sheet

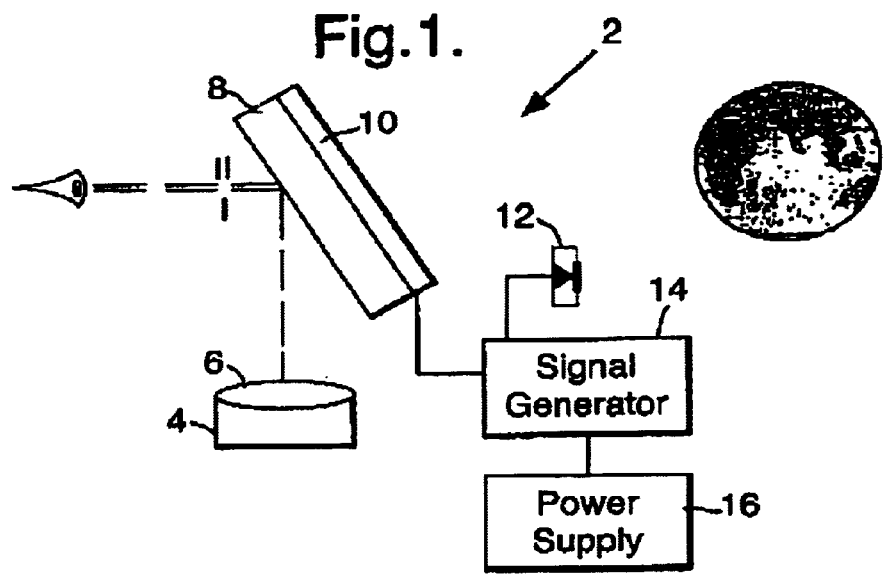
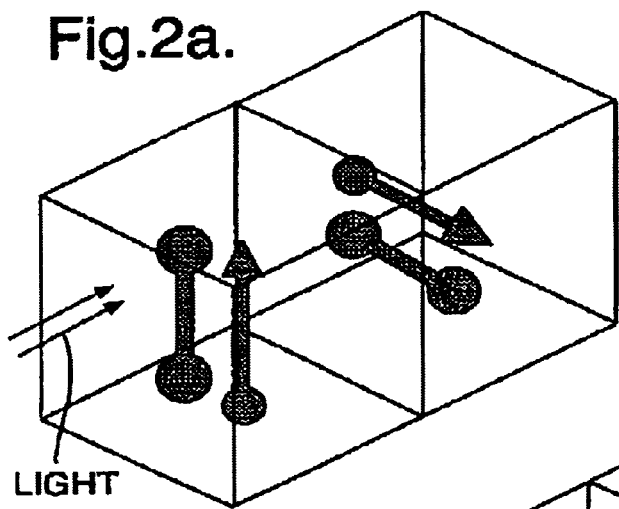
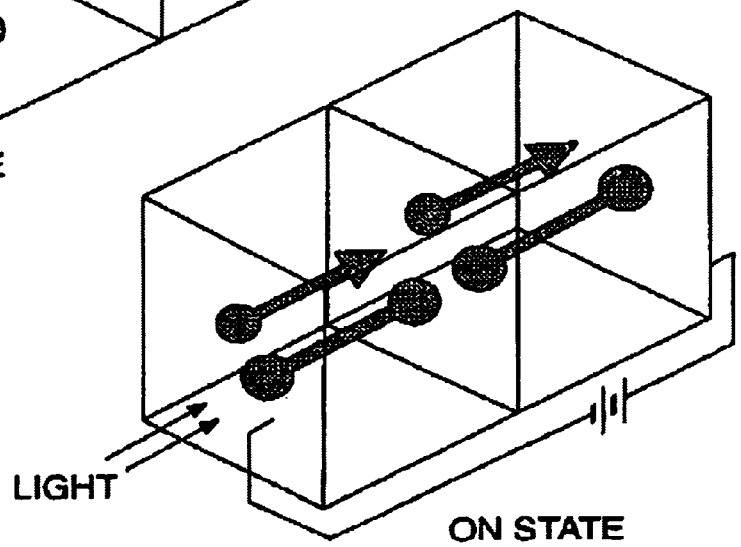

VARYING LIGHT TRANSMITTANCE THROUGH A DISPLAY PANEL

FIELD OF THE INVENTION

The present invention relates to electro-optic imaging devices for display applications. More particularly, the present invention relates to a system and a method for varying the transmittance of light through a media on which images are displayed, based on non-conventional liquid crystal device (LCD) technology.

BACKGROUND OF THE INVENTION

Head-up display systems (HUDs) and head-mounted displays (HMDs) are becoming increasingly widespread applications used for people under operational and time-dependent stresses and limitations. The displayed information is either of symbol graphics or alphanumerics for aeronautic pilot assistance during maneuver or combat tasks, or image displays for enhanced vision to assist aircraft landing or automotive drivers in adverse illumination or weather conditions. Among many other applications of such systems are included real-time physionometric data to be used by medical doctors and visual assembly instructions to be used by manufacturing workers.

The above-mentioned HUD and HMD systems utilize one or more combiner optical windows having see-through characteristics, which project display information superimposed on the background scene, thereby enabling the operator to perceive both the data and the background image without having to move his eyes and head back and forth between the display and the outside scene. Unfortunately, during outdoor applications, a background scene illuminated by sunlight is often of a very high brightness, in extreme cases approaching several thousand fL. Direct sunlight is even several orders of magnitude larger in brightness. If, for example, the displayed image has a brightness of 500 fL, the contrast of the displayed image against a background of 4000 fL will drop to about 11%. However, if the background brightness can be reduced to 800 fL, then the displayed image contrast will rise to about 40%.

There are two principal ways of reducing the background brightness: (a) utilization of a fixed, transparent shield of high optical density (as in sunglasses), and (b) using variable transmittance optics (VTO) with real-time adaptive transmittance. The introduction of a fixed shield according to method (a) is disadvantageous, because it will significantly reduce the visibility of the background scene under poor illumination. As a consequence, the VTO of method (b) is preferred, because it does not obstruct the view of the outside world in conditions of poor illumination.

Several technologies exist that could serve as VTOs, such as photochromic materials, electrochromic cells, and conventional LC technology. The photochromic materials suffer from some drawbacks, such as limited spectral and photochemical sensitivity, making most of these materials highly dependent on strong UV illumination which, with sunlight, prevails at noon time and is strongly reduced behind window shields. The electrochromic cells have very slow response times in the order of minutes, and hence they are not practical for fast-changing illumination conditions. Conventional LCD panels, sandwiched between polarizers and quarter-wave plates, have been proposed for welding filter VTO applications. Unfortunately, polarizers absorb an important part, over 50%, of the display illumination. Therefore, conventional LCD devices are impractical in HUD or HMD applications, because of the necessity to introduce polarizers which significantly reduce the brightness of the outside scenery and consequently are not acceptable to aeronautic or automotive users.

SUMMARY OF THE INVENTION

It is therefore a broad object of the present invention to overcome the disadvantages and limitations discussed above and to provide a system and a method for floating see-through image displays integrated with variable transmittance optical panels, such as windows or visors.

It is a primary object of the present invention to utilize suitable variable transmittance optical windows of non-conventional liquid crystal (LC) technology and materials, which can yield very high, maximal transmittance of light of over 50% and have low absorbance, reflectance or low scattering, which are of utmost importance in cases where the background scenery, as seen through the windows, is of poor illumination, so that the perceived background does not become one of poor visibility.

It is a further object of the present invention to utilize the same technology to adaptively reduce the transmittance of light through the VTO by a significant factor or contrast ratio of at least five, so as to provide sufficient image contrast of the display when it is viewed superimposed on a background object of very high brightness.

Another further specific objective of the present invention is to utilize suitable VTO technology, chosen from non-conventional, polarizer-free LC media including guest-host (GH) dichroic or pleochroic LCs and optimized GH polymer-stabilized cholesteric textures (GH-PSCT) or optimized GH surface-stabilized cholesteric textures (GH-SSCT), and/or combinations and derivatives of said non-conventional media. These media allow maximal light utilization because they minimize absorption losses from polarizers and do not exhibit scattering losses and thus allow large, maximal transmittance of light. Similarly, these media allow adaptive reduction in transmittance without negatively affecting the perceived background image, again because no additional light scattering is introduced which might reduce the background image contrast.

Yet another object of the present invention is to provide suitable contrast ratios so as to allow application of the proposed display devices in large ranges of background illumination conditions. This objective can be achieved by the configuration wherein two GH cells of mutually perpendicular alignment are stacked on top of each other. Such a configuration operates, as a matter of fact, as two orthogonal polarizers having a large range of variable transmittance of light, ranging from large extinction to maximal transmittance.

A still further objective of the present invention is to provide suitable light detector feedback electronic methods and systems for real-time VTO control of background brightness adaptation, so as to achieve constant information display contrast.

Another objective of the present invention is to provide methods for varying the transmittance of light over the VTO in a non-uniform manner, by applying mosaic structured cell assemblies having more than one electrical LC cell over the field of view (FOV) of the VTO, in conjunction with a multitude of light-sensor arrays and their corresponding electronic feedback. In such a mosaic or similar arrays, area-selective VTO action may be applied in order to selectively change the transmittance through the VTO in sub-areas of the FOV.

In accordance with the present invention, there is therefore provided a system for varying the transmittance of light through selected portions of a media on which images are displayed, said system comprising an image display panel; an image display source for projecting images on said media; LC-based, variable transmittance optical (VTO) media; a light sensor for measuring ambient light, and a signal generator connected to said VTO media for applying voltage to portions of said media at levels determined and controlled by said sensor, whereby the transmittance of light through said portions of said media is varied in accordance with the prevailing ambient light.

The invention further provides a method for varying the transmittance of light through selected portions of a media on which images are displayed, said method comprising providing an image display panel; providing a guest-host liquid crystal (GHLC) media, and applying voltages of selected levels to said portions of said GHLC media, depending on the prevailing ambient light, to effect changes in the transmittance of light through said portions of the media.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a schematic illustration of the system of the present invention for floating see-through displays with VTO, and FIGS. 2a and 2b are schematic illustrations showing a double layer cell configuration of the invention in two states.

DETAILED DESCRIPTION

The main elements of the present invention are shown schematically in FIG. 1, exemplifying an HUD system; however, experts familiar with the state of the art may easily recognize other projection or imaging configurations, such as overhead, side, light-guided, or retina projections, etc., and modified installations and derivable applications such as, e.g., helmet, head, eyeglass, telescope, or windshield-mounted, image capture (camera) systems. As shown, the system 2 consists of a primary display source 4, e.g., a CRT, LCD or the like, including its driver electronics; image projection optics 6, projecting the displayed image to quasi-infinity; a flat or curved panel 8, e.g., a combiner, window or visor, for directing the projected image to the viewer's eye, a VTO media 10 made of a non-conventional LC cell for adaptively varying the transmittance of light through the combiner, attached to, or in close proximity to, the panel 8, and a light sensor 12 in conjunction with feedback electronics to the VTO window 10, including a signal generator 14 and a power supply 16.

An unique feature of the invention consists of the VTO media 10, employing LCD principles. In order to preserve the background images with good optical clarity, it is necessary to utilize 2D flat-panel media of good optical quality. Specifically, it is required that the VTO media have very high transmittance of light, i.e., low absorbance or scattering, in the case of very low illumination of the outside scene, such as during dawn or dusk, at night, and under adverse weather conditions. In addition, it is required that the transmittance of the VTO media may be reduced by a significant factor, for example, a factor of five, without affecting their optical quality, namely, with no additional scattering, haze, coloration, etc.

Furthermore, the flat VTO media must have real-time adaptive transmittance of light, so as to be responsive during short enough times under varying background brightness conditions. This is obtained by utilizing non-conventional LCD technology. Therefore, conventional pairs of polarizers are not applied in the present invention, but rather, a system containing VTO media 10 is obtained by applying one or more non-conventional LC cells in conjunction with a panel 8 utilizing polarizer-free media, thereby achieving high maximal brightness. Such non-conventional LCDs that are polarizer-free incorporate dichroic or pleochroic dyes mixed into the LC phases, hereinafter termed guest-host liquid crystal (GHLC) phases. Dichroic or pleochroic dyes are linear, stick-like molecules having large anisotropic absorbance, strongly depending on incident light polarization. When such molecules are mixed within nematic LC phases, they orient themselves along the LC phase director and, as a result, exhibit switchable absorbance/transmittance variations. Differentiation is made between two classes of GHLC phase distributions: (1) the LC phase, consisting of randomly dispersed and oriented microphases such as GHLC droplets or GHLC microdomains, which are embedded in polymer matrices, and (2) the GHLC phase, consisting of a homogeneous GHLC phase derived from the LC materials and phases of nematic, twisted nematic, supertwisted nematic, cholesteric, smectic phases, other phases, and their combinations and mixtures.

An example of a specific embodiment of the present invention is the incorporation of polymer dispersed LCs (PDLCs) of guest-host (GH) dichroic PDLC (GH-PDLC) and their subclasses, such as PSCT, NCAP, which enable devices operating according to GHLC class 1 structure. However, the exploitation of the GHLC structures according to class 1 is not straightforward because of their inherent scattering properties, due to refractive index mismatch of the LC phase relative to the surrounding phase. Therefore, for practical exploitation of class 1 structures, specifically but not exclusively in visor-type applications, light scattering has to be eliminated or reduced to negligible levels. This is accomplished in the following ways: (1) The GHLC phases have to apply LC materials of very small birefringence originating from small dielectric anisotropy, with the average LC index being close to the surrounding polymer phase, or (2) the sizes of the microdroplets or microdomains will be significantly smaller than the wavelength of the interacting light, so as to reach negligible light scattering. The resultant systems will then be dominantly absorption-modulated, leading to the desired VTO characteristics.

Another embodiment of the present invention is the incorporation of guest-host (GH) dichroic LCDs using homogeneous nematic phases (Heilmeier type) or cholesteric phases (White-Taylor type), operating according to LC phase class 2 structures, in order to realize polarizer-free media. In these devices, dichroic dye guests are mixed into the homogenous LC phase hosts. Media utilizing these kinds of materials usually have the property of pure absorption-modulated images, without any light scattering.

As schematically depicted in FIG. 1, a suitable calibrated light sensor 12 with an adjusted sensitivity range measures the outdoor luminance within a predefined field of view; according to the measured luminance, in conjunction with the dynamic range of the VTO media transmittance-voltage response curve, the VTO media 10 adjusts its transmittance of light in real time and automatically, so as to produce an image display contrast within given tolerances.

As additional features, manual transmittance control and consequently, manual image contrast control (not shown) can be installed for the comfort of the user, so that he may adapt the brightness of the background scene in conjunction with the image display contrast to personal needs such as eye sensitivity and acuity.

Another embodiment of the present invention is the application of a double cell configuration of mutually perpendicular (crossed) LC director orientation so as to increase the dynamic range of the VTO media or, in other words, the VTO media contrast ratio. In this configuration, schematically depicted in FIG. 2 for the case of a normal mode operation, the LC director of one cell is orthogonal to that of the other, the cells thereby behaving as two crossed polarizers when no voltage is applied (FIG. 2a). When voltage is applied to the two cells (FIG. 2b), the GHLCs switch to the homeotropic phase, with the director being perpendicular to the cell surface. As a result, the dichroic dye absorption is minimal and the transmittance of light becomes maximal. Theoretically, the transmittance of normally incident light may vary between almost zero to 100%, with the experimental values depending on material and device parameters, such as concentration, the degree order in LC alignment, dependence on the LC and GH materials, and cell parameters.

Some points to be considered for a successful application of the VTO-HUD system of the invention and its derivatives are that the addition of the VTO LC cell must have good optical quality, so as not to deteriorate the quality of the projected image from the primary display, and likewise, not to deteriorate the quality of the perceived background image. These simultaneous system demands and conditions are met, for example, preferably by applying a selective reflective coating, optimized for the wavelength of the primary display, on the inside of the panel 8 close to the display and the eye, and preferably by applying an antireflective (AR) coating and by attaching AR-coated VTO LC cells on the outside of the panel 8.

It should be noted that the invention also enables varying the transmitance of light over the VTO in a non-uniform manner, by applying mosaic structured cell assemblies having more than one electrical LC cell over the field of view (FOV) of the VTO, in conjunction with a multitude of light-sensor arrays and their corresponding electronic feedback. In such a mosaic or similar arrays, area-selective VTO action may be applied in order to selectively change the transmittance through the VTO in sub-areas of the FOV.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A system for varying the transmittance of light through selected portions of a display, said system comprising:
   an image display panel;
   an image display source for projecting images on said panel;
   an LC-based, variable transmittance optical (VTO) media;
   a light sensor for measuring ambient light; and
   a signal generator connected to said VTO media for applying voltage to portions of said media at levels determined and controlled by said sensor;
   whereby the transmittance of light through said portions of said media is varied in accordance with the ambient light which results in a corresponding variation in the transmissivity of said portions of the panel.

2. The system as claimed in claim 1, wherein said image display panel is an optical combiner.

3. The system as claimed in claim 1, wherein said panel is a window or a visor.

4. The system as claimed in claim 1, wherein said media is at least in indirect contact with said panel.

5. The system as claimed in claim 1, wherein said LC-based VTO media is a polarizer-free media.

6. The system as claimed in claim 1, wherein said LC-based VTO media is a guest-host LC (GHLC).

7. The system as claimed in claim 6, wherein said GHLC incorporates dichroic or pleochroic dyes mixed into said LC.

8. The system as claimed in claim 6, wherein said GHLC is selected from the group of GHLC droplet or GHLC microdomain phases embedded in polymer matrices.

9. The system as claimed in claim 6, wherein said GHLC comprises LC substances in the form of a phase selected from the group consisting of nematic, twisted nematic, supertwisted nematic, cholesteric, smectic phases, and combinations thereof.

10. The system as claimed in claim 1, wherein said LC media are contained within one electrical cell.

11. The system as claimed in claim 1, wherein said LC media are contained within at least two mutually orthogonally oriented, stacked electrical cells.

* * * * *